(12) United States Patent
Carlioz et al.

(10) Patent No.: US 11,565,818 B2
(45) Date of Patent: Jan. 31, 2023

(54) TRAY TABLE APPARATUS FOR A CONSOLE ELEMENT, CONSOLE ELEMENT AND SEAT UNIT

(71) Applicant: Adient Aerospace, LLC, Bothell, WA (US)

(72) Inventors: Victor Carlioz, Manhattan Beach, CA (US); Matthew Cleary, El Segundo, CA (US)

(73) Assignee: Adient Aerospace, LLC, Bothell, WA (US)

( * ) Notice: Subject to any disclaimer, the term of this patent is extended or adjusted under 35 U.S.C. 154(b) by 3 days.

(21) Appl. No.: 17/229,779

(22) Filed: Apr. 13, 2021

(65) Prior Publication Data

US 2021/0316866 A1    Oct. 14, 2021

Related U.S. Application Data (60) Provisional application No. 63/009,048, filed on Apr. 13, 2020.

(51) Int. Cl.
 *B64D 11/06*    (2006.01)

(52) U.S. Cl.
 CPC .............................. *B64D 11/0638* (2014.12)

(58) Field of Classification Search
 CPC ....... B64D 11/0638; B60N 3/004; A47B 5/00; A47B 31/06
 USPC ................................... 108/44; 297/146, 147
 See application file for complete search history.

(56) References Cited

U.S. PATENT DOCUMENTS

| | | | | |
|---|---|---|---|---|
| 1,900,325 A | * | 3/1933 | Bayman | A47B 31/06 224/547 |
| 2,719,066 A | * | 9/1955 | Budzinski | A47B 31/06 108/45 |
| 2,860,021 A | * | 11/1958 | Steele | B60N 3/002 108/45 |
| 3,859,931 A | * | 1/1975 | Lalonde | B60N 3/002 108/44 |
| 3,899,982 A | * | 8/1975 | Fetzek | A47B 31/06 312/246 |
| 4,040,659 A | * | 8/1977 | Arnold | B60N 2/793 297/188.17 |
| 4,159,071 A | * | 6/1979 | Roca | B64D 11/06 108/42 |

(Continued)

FOREIGN PATENT DOCUMENTS

| | | | | |
|---|---|---|---|---|
| EP | 3275735 A1 | * | 1/2018 | ............... B60R 7/02 |
| FR | 2902724 A1 | * | 12/2007 | ............. A47B 5/006 |
| WO | WO-2013142821 A1 | * | 9/2013 | ............... A47B 1/10 |

*Primary Examiner* — Jose V Chen (57) ABSTRACT

A tray table apparatus includes a table carrier structure releasably mountable to a console element, wherein the table carrier structure is configured as a housing. The tray table apparatus further includes an adjustment mechanism housed within the table carrier structure, wherein the adjustment mechanism has a table support element movable relative to the table carrier structure. The tray table apparatus also includes a table element coupled to the table support element and together movable between at least a retracted stowed position in which the table element is housed within the table carrier structure and a deployed use position in which the table element protrudes from the table carrier structure.

17 Claims, 10 Drawing Sheets

(56) References Cited

U.S. PATENT DOCUMENTS

| | | | | |
|---|---|---|---|---|
| 4,417,764 | A * | 11/1983 | Marcus | B60N 2/793 |
| | | | | 297/188.17 |
| 5,370,060 | A * | 12/1994 | Wang | B60N 3/004 |
| | | | | 297/163 |
| 5,876,092 | A * | 3/1999 | An | B64D 11/0638 |
| | | | | 297/146 |
| 7,963,231 | B2 * | 6/2011 | Osborne | A47B 5/006 |
| | | | | 108/42 |
| 8,596,206 | B2 * | 12/2013 | Legeay | B64D 11/0638 |
| | | | | 297/145 |
| 10,875,652 | B2 * | 12/2020 | Chuang | A47B 46/00 |
| 2010/0326333 | A1 * | 12/2010 | St. Louis | B64D 11/06 |
| | | | | 108/44 |
| 2017/0238696 | A1 * | 8/2017 | Ehrreich | A47B 5/06 |
| 2018/0281966 | A1 * | 10/2018 | Chuang | A47B 46/00 |
| 2018/0305023 | A1 * | 10/2018 | Moulton | B64D 11/0605 |
| 2018/0319504 | A1 * | 11/2018 | Porter | E05C 19/12 |
| 2019/0061954 | A1 * | 2/2019 | Miedema | A47B 3/00 |
| 2019/0308538 | A1 * | 10/2019 | Buchanan | B60N 3/004 |
| 2020/0237092 | A1 * | 7/2020 | Paindavoine | B60N 3/001 |
| 2021/0282545 | A1 * | 9/2021 | Bugg | A47B 13/10 |
| 2022/0135230 | A1 * | 5/2022 | Satterfield | B64D 11/0638 |
| | | | | 108/44 |

* cited by examiner

TRAY TABLE APPARATUS FOR A CONSOLE ELEMENT, CONSOLE ELEMENT AND SEAT UNIT

CROSS-REFERENCE TO RELATED APPLICATION

This application claims the benefit of and priority to U.S. Provisional Application No. 63/009,048, entitled "Tray Table Apparatus For A Console Element, Console Element And Seat Unit", filed Apr. 13, 2020, which is incorporated by reference herein in its entirety.

BACKGROUND

Seat units, such as for an aircraft, can have a seat and an adjacent console element. The console element in some configuration has a tray table for the adjacent seat. For example, some known configurations provide an aircraft seat device having a table device with at least two linear guidance elements directly mounted to a console to allow a linear translational movement. In this known configuration, at least two pivot joints implement different rotational axes to carry out rotational movement of the table device. This configuration can make assembly, installation, and/or maintenance of the component parts difficult and/or time consuming. Additionally, the configuration may have a less appealing look as a result of the exposed elements.

SUMMARY

In one aspect, a tray table apparatus includes a table carrier structure releasably mountable to a console element, wherein the table carrier structure is configured as a housing. The tray table apparatus further includes an adjustment mechanism housed within the table carrier structure, wherein the adjustment mechanism has a table support element movable relative to the table carrier structure. The tray table apparatus also includes a table element coupled to the table support element and together movable between at least a retracted stowed position in which the table element is housed within the table carrier structure and a deployed use position in which the table element protrudes from the table carrier structure.

In another aspect, a console element for a seat includes a console base structure having a front utility structure and an open rear structure. The console element further includes a tray table apparatus having a table carrier structure releasably mountable to the console base structure, and an adjustment mechanism housed within the table carrier structure and having a table support element movable relative to the table carrier structure. The table element is coupled to the table support element, with the table element movable with the table carrier structure between at least a retracted stowed position in which the table element is housed within the table carrier structure and a deployed use position in which the table element protrudes from the table carrier structure.

In another aspect, an aircraft seat unit includes a console element arranged substantially laterally relative to the seat and having a front utility structure for a passenger of the seat and an open rear structure with at least a tray table apparatus for a passenger seated behind the console element. A tray table apparatus having a table carrier structure is releasably mountable to a console base structure of the console element. An adjustment mechanism is housed within the table carrier structure and has a table support element movable relative to the table carrier structure between at least a retracted stowed position in which a table element is housed within the table carrier structure and a deployed use position in which a table element protrudes from the table carrier structure.

BRIEF DESCRIPTION OF THE DRAWINGS

The present disclosure will become more fully understood from the detailed description given herein below and the accompanying drawings which are given by way of illustration only, and thus, are not limitative of the present disclosure, wherein.

Corresponding parts are marked with the same reference symbols in all figures.

DETAILED DESCRIPTION

The foregoing summary, as well as the following detailed description of certain embodiments and implementations will be better understood when read in conjunction with the appended drawings. As used herein, an element or step recited in the singular and preceded by the word "a" or "an" should be understood as not necessarily excluding the plural of the elements or steps. Further, references to "one embodiment" or "one implementation" are not intended to be interpreted as excluding the existence of additional embodiments or implementations that also incorporate the recited features. Moreover, unless explicitly stated to the contrary, embodiments "comprising" or "having" an element or a plurality of elements having a particular property can include additional elements not having that property.

While various spatial and directional terms, such as "top," "bottom," "upper," "lower," "vertical," and the like are used to describe embodiments and implementations of the present disclosure, it is understood that such terms are merely used with respect to the orientations shown in the drawings. The orientations can be inverted, rotated, or otherwise changed, such that a top side becomes a bottom side if the structure is flipped 180 degrees, becomes a left side or a right side if the structure is pivoted 90 degrees, and the like.

Certain implementations of the present disclosure provide a tray table apparatus for a console element, wherein the tray table apparatus is configured as a pre-assembled module that is releasably mountable to the console element. As a result, an assembly and disassembly for maintenance work, repair work or component exchanging is simplified in various examples.

In some examples, a console element with a tray table apparatus and seat unit include a seat and a substantially adjacent console element with a tray table apparatus for a passenger seated behind the seat unit. In one implementation, a table carrier structure is releasably mountable to a console element and is configured as a housing. An adjustment mechanism is housed within the table carrier structure and has a table support element movable relative to the table carrier structure. A table element is fixed to the table support element and movable between at least a retracted stowed position in which the table element is housed within the table carrier structure and a deployed use position in which the table element protrudes from the table carrier structure.

A simple and compact tray table apparatus that can be used with different types of console elements, and is substantially lightweight having a compact built-in design. Any component of the tray table apparatus is exchangeable in an easy manner, and the table carrier structure is configurable in different shapes, such that the structure is individually formed to fit to a console element. In operation, the tray table element, such as a table top, is stowed in the retracted stowed position within the table carrier structure, such that the tray table element is protected against external influences, e.g. dust and dirt. As such, an optical appearance is improved and passenger space increased when the tray table element is in the retracted stowed position.

As described in more detail herein, the tray table apparatus is configured in some implementations as a cassette assembly. For example, the console element or any other structural component of a vehicle having an open space can be used, such that the tray table apparatus is easily insertable into the open space (e.g., at least form-fitting and/or force-fitting attachable thereto). The tray table apparatus is a pre-assembled module (e.g., the table carrier structure, the adjustment mechanism and the table element are pre-assembled together to form the pre-assembled module) in some examples and configured to be releasably mountable to a console element or other aircraft cabin element, such as a bulkhead. For example, the tray table apparatus can be attached to any free mounting space of a structural element.

Figure 1A:
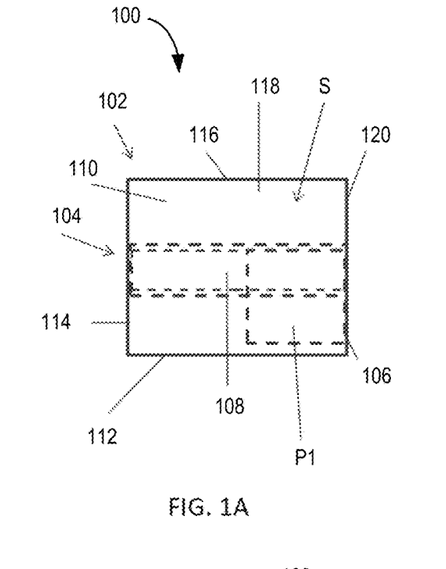
FIGS. 1A to 1C show schematically in upper views an implementation of a tray table apparatus in accordance with an example.
Figure 1B:
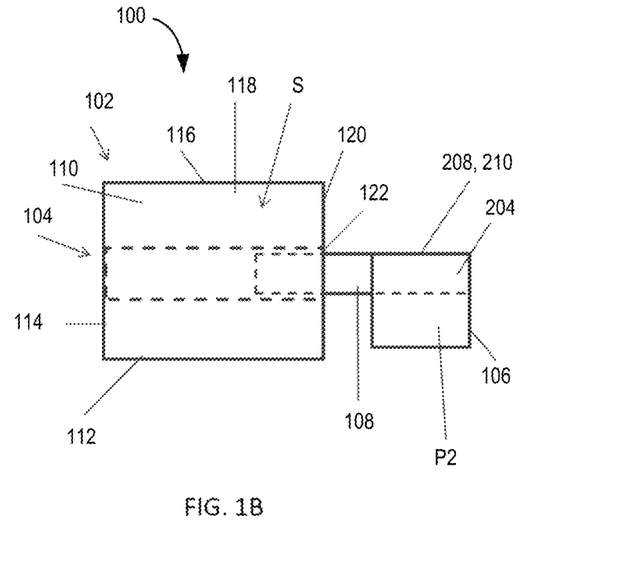
Figure 1C:
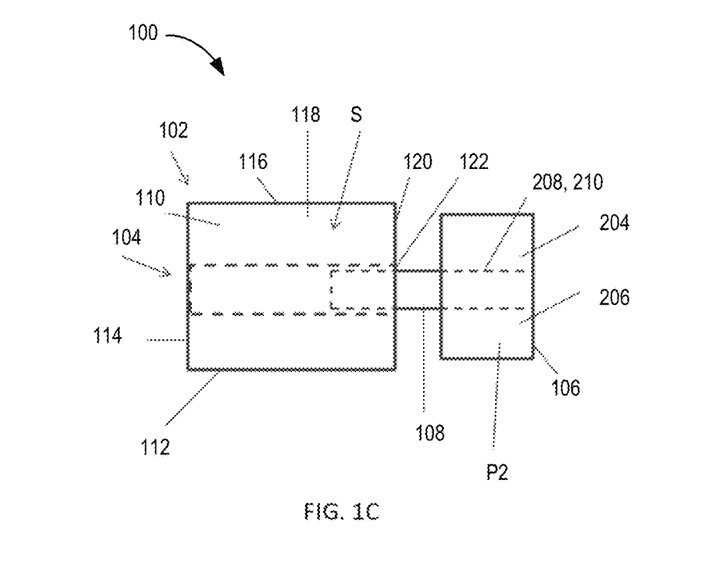

FIGS. 1A to 1C show schematically in upper views an implementation of a tray table apparatus 100 for a console element 200 (shown in FIGS. 3 and 4A to 4C). The tray table apparatus 100 in the illustrated example includes a table carrier structure 102 that is releasably mountable to the console element 200 and defines a housing or casing. The tray table apparatus 100 includes an adjustment mechanism 104 that is housed within the table carrier structure 102. The adjustment mechanism 104 includes a table support element 108 (e.g., a support arm or other support structure) movable relative to the table carrier structure 102. In the illustrated example, the tray table apparatus 100 further includes a table element 106, such as a passenger table, coupled (e.g., fixedly attached) to the table support element 108. In operation, the table element 106 is movable between at least (i) a retracted stowed position P1 (as shown in FIG. 1A) in which the table element 106 is housed within the table carrier structure 102 and (ii) a deployed use position P2 (as shown in FIGS. 1B and 1C) in which the table element 106 protrudes or extends from the table carrier structure 102 (e.g., is useable by a passenger on an aircraft). That is, in the deployed use position P2, the table support element 108 is moved (e.g., translated) outward from the table carrier structure 102, such that the table element 106 housed therein is moved to be accessible by a user.

In one implementation, the tray table apparatus 100 is configured as a pre-mounted assembly, such as a cassette-like pre-mounted assembly. For example, FIG. 1A shows the tray table apparatus 100 with pre-assembled components, wherein the table element 106 and the table support element 108 are positioned within the table carrier structure 102. The tray table apparatus 100 with pre-assembled components is a fully functional package in various implementations. For example, the console element 200 or any other structural component of a vehicle cabin may provide an open space in which the tray table apparatus 100 is easily insertable, when the table element 106 is in the retracted stowed position P1 (e.g., inserted into the open space and form-fitting and/or force-fitting attachable thereto).

In one example, the tray table apparatus 100 is configured as a pre-assembled module M to be releasably mountable to the console element 200 or any other aircraft cabin element, such as a bulkhead. For instance, the table carrier structure 102, the adjustment mechanism 104 and the table element 106 are assembled together to build or form the pre-assembled module M. As such, installation and/or replacement of the is facilitated by the pre-assembled design of the module M.

The table carrier structure 102 defines a housing in the illustrated example that includes an open housing side 110 (e.g., an open upper housing side). For example, in an aircraft application, the table carrier structure 102 is configured to be open towards a ceiling of an aircraft cabin. As such, the adjustment mechanism 104 is easily mounted into the table carrier structure 102 through the open housing side 110. When arranged in the console element 200, the open housing side 110 (e.g., open towards a ceiling of the aircraft cabin) may be covered by an upper structure of the console element 200 (e.g., an outer covering) as described in more detail herein. Optionally or additionally, the table carrier structure 102 is open and freely accessible from one or more different housing sides 112, 114, 116, for example, to exchange and/or repair single components. Thus, in various examples, the table carrier structure 102 is configured as a housing which is at least partially open on at least one side. As such, the adjustment mechanism 104 in some examples is integrated into the table carrier structure 102 in a simplified manner through the open housing side 110 of the table carrier structure 102.

It should be noted that different configurations of the table carrier structure 102 are contemplated. For example, the table carrier structure 102 can be configured as a casing or housing with fully covered sides embedding a mounting space within the casing or housing.

In the illustrated example, the table carrier structure 102 includes a base plate 118 and at least one front wall 120 extending vertically from the base plate 118, for example, perpendicular to the base plate 118 and in a direction towards the ceiling of the aircraft cabin. The base plate 118 and the front wall 120 define a space S behind the front wall 120, wherein in the retracted stowed position P1, the table element 106 is fully retracted and arranged behind the front wall 120 and above the base plate 118. In the deployed use position P2, the table element 106 is guided and passes through an opening 122 of the front wall 120 of the table carrier structure 102. That is, the table element 106 is movable in and out of the table carrier structure 102 through the opening 122 in the front wall 120.

In one example, the space S behind the front wall 120 is at least open in a direction towards the ceiling of the aircraft cabin. The base plate 118 is releasably mountable to the console element 200. As should be appreciated, because the table carrier structure 102 is in the console element 200, the table carrier structure 102 can be assembled from a reduced number of components, such that the console element 200 encloses the open housing sides 110, 112, 114, 116. In some examples, the front wall 120 is configured to be flush with a console surface (e.g., forming a planar surface) and covering the space S behind the front wall 120 from a passenger's view, as well as providing a protective covering for the adjustment mechanism 104 and the table element 106 when stowed as described in more detail herein.

Thus, the front wall 120 includes at least one opening 122 through which the table support element 108 (and the table element 106 coupled thereto) are guided when the table element 106 is moved to or positioned in the deployed use position P2. In the illustrated implementation, a front side 202 of the table element 106, which points in a direction towards a passenger, is flush with the front wall 120 in the retracted stowed position P1. Optionally, in some implementations, the front side 202 is configured to be located slightly protruding from the front wall 120 (pointing in a direction towards the passenger) when in the retracted stowed position P1, such that the passenger can grab the protruding portion of the table element 106 and manually pull the table element 106 from the retracted stowed position P1 to the deployed use position P2.

It should be noted that the base plate 118 in various implementations supports various components in addition to the components described above. For example, in one implementation the adjustment mechanism 104 is supported on the base plate 118 of the table carrier structure 102.

In some implementations, the table element 106, in particular the table support element 108, is linearly displaceable relative to the table carrier structure 102. In the deployed use position P2, the table element 106 is positioned in front of a passenger seated behind the console element 200. For example, the table element 106 is positioned above a passenger's lap in the deployed use position P2.

The table element 106 is configured in some examples as a bi-fold table. For example, the table element 106 includes two table tops 204, 206 (or leaves) that are hinged to each other on respective lateral portions 226, 228. One table top 204 is foldable onto the other table top 206. The non-foldable table top 206 is fixedly mounted to the table support element 108 in one implementation. When the table tops 204, 206 are in an unfolded state (as shown in FIG. 1C), both table tops 204, 206 are arranged in a single horizontal plane, for example, providing an enlarged dining surface or working surface for the passenger. The table element 106 is also usable in its folded state (as shown in FIG. 1B), wherein the passenger movement space is increased, e.g., for egress or ingress. In operation, the table element 106 is storable within the table carrier structure 102 when the table tops 204, 206 are in the folded state. As such, the opening 122 of the front wall 120 is configured in the illustrated implementation to be smaller in comparison to a full width of the table element 106 in the unfolded state. Thus, the front wall 120 provides more mounting area, for example, for operational elements, such as switches to actuate a deployment of the table element 106 and/or lighting or other devices.

Figure 2A:
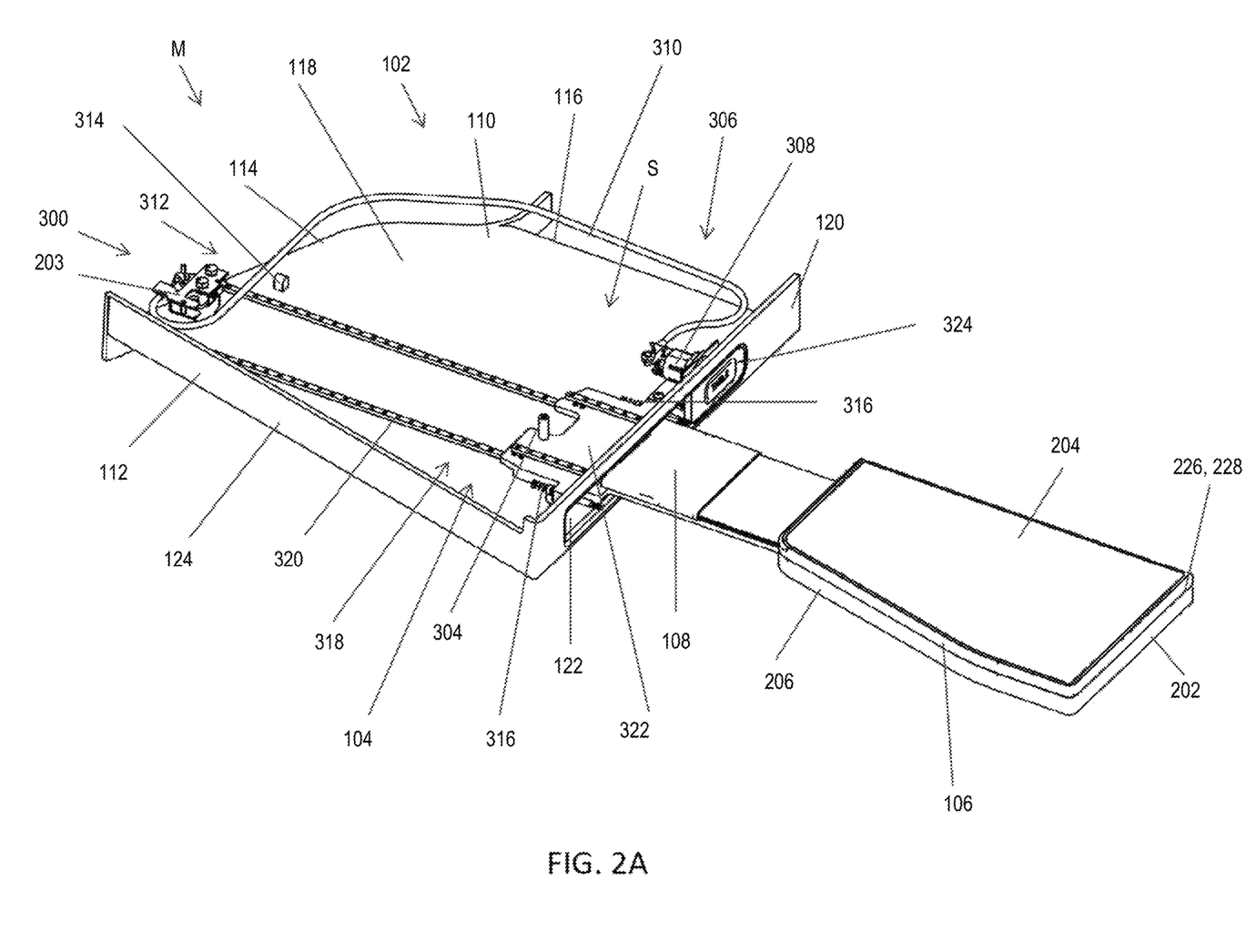
FIGS. 2A and 2B show schematically in a perspective view and a top view an implementation of a tray table apparatus in accordance with an example.
Figure 2B:
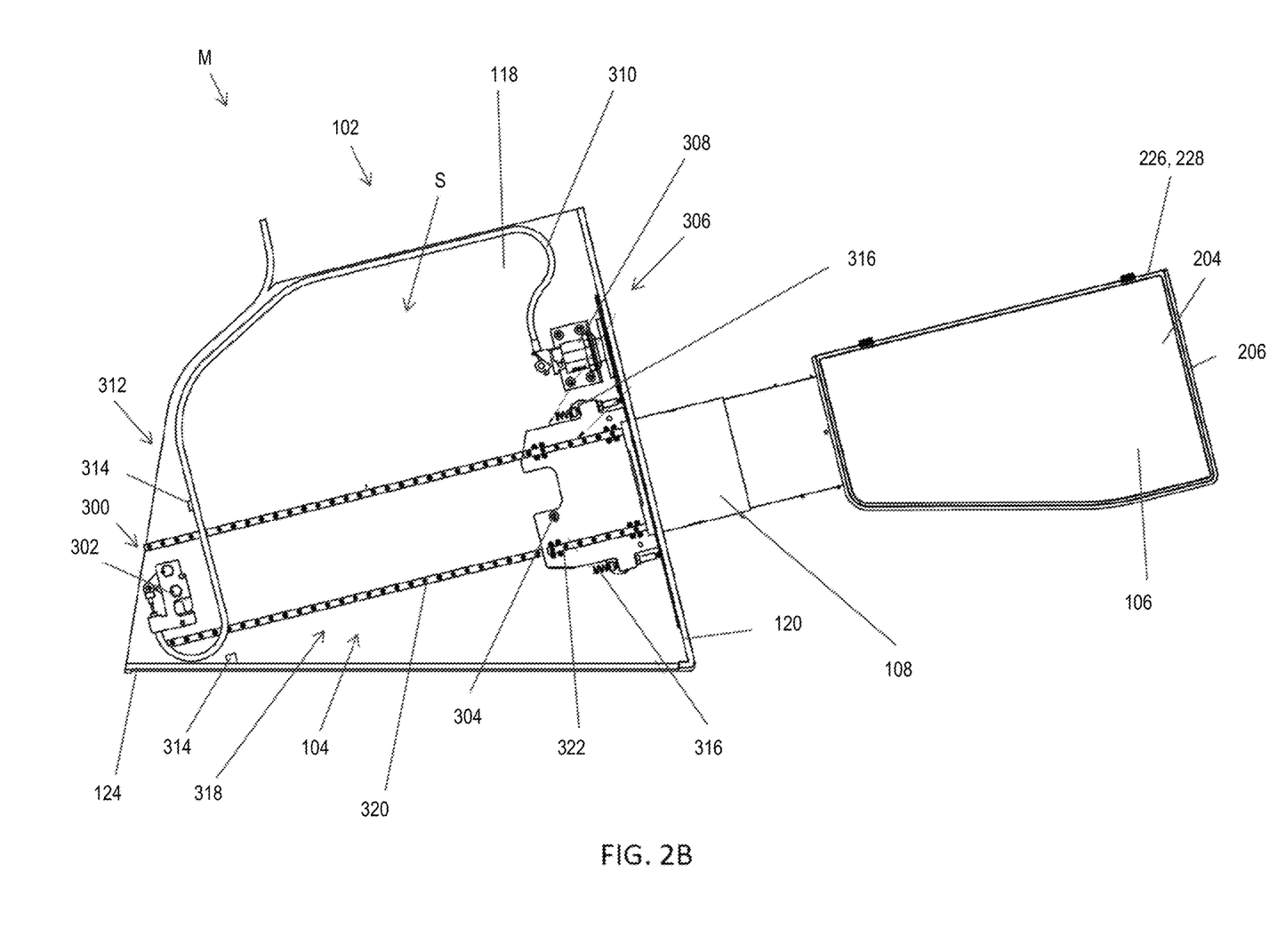

FIGS. 2A and 2B show schematically in a perspective view and a top view an implementation of the tray table apparatus 100. As described herein, the tray table apparatus 100 includes the table carrier structure 102, which is releasably mountable to the console element 200 shown in FIG. 3 (configured as a housing or casing in this implementation). As can be seen, the tray table apparatus 100 includes the adjustment mechanism 104 housed within the table carrier structure 102. The adjustment mechanism 104 includes the table support element 108 movable relative to the table carrier structure 102. As described in more detail herein, the tray table apparatus 100 include the table element 106 fixed to the table support element 108, such that the table element 106 is movable between at least a retracted stowed position P1 (as shown in FIG. 1A) in which the table element 106 is housed within the table carrier structure 102 and a deployed use position P2 as shown in FIGS. 2A and 2B, wherein the table tops 204, 206 are in a folded state and protrude in a direction away from the table carrier structure 102.

As can be seen in FIGS. 2A and 2B, the table carrier structure 102 further includes at least a side wall 124 extending vertically from the base plate 118 and which is connected to the front wall 120. Depending on a shape of the console element 200 and/or a position of an aligned seat 400 (shown in FIGS. 4A to 4C) relative to the console element 200, a shape of the table carrier structure 102 and/or an arrangement of the adjustment mechanism 104 within the table carrier structure 102 can be varied or adjust (e.g., sized and shaped accordingly). In the illustrated implementation, an end side of the adjustment mechanism 104 is arranged in an area of a rear corner of the base plate 118. The side wall 124 is configured to protect the adjustment mechanism 104 in the corner area of the table carrier structure 102 and laterally along the housing side 112.

In the illustrated implementation, the adjustment mechanism 104 includes a latch mechanism 300 having a latch device 302 and a corresponding latch element 304, such as a pin, bolt or restraining bar or loop, or other latching mechanism. The latch device 302 is configured as a rotary latch having an engaging pawl that engages the latch element 304 in a locked state in the retracted stowed position P1 of the table element 106 and which releases the latch element 304 when actuated. The latch device 302 is mounted on the base plate 118 of the table carrier structure 102 and the corresponding latch element 304 is mounted on the table support element 108, or vice versa. The adjustment mechanism 104 further includes a latch release mechanism 306 having a release actuation device 308 and a release cable 310, such as a Bowden cable connecting the release actuation device 308 and the latch device 302 of the latch mechanism 300. The release actuation device 308, such as a button or switch, is arranged in an area of the front wall 120 of the table carrier structure 102, for example, in another opening 324 formed in the front wall 120. When a passenger pushes the release actuation device 308, the release cable 310 transmits an actuation force to the latch device 302 to disengage and release the latch element 304. The release cable 310 is arranged within the table carrier structure 102, in particular in the space S behind the front wall 120 and above the base plate 118.

The adjustment mechanism 104 includes a mechanical deploy mechanism 312 having two distanced brackets 314 and two corresponding spring elements 316. The brackets 314 are mounted on the base plate 118 of the table carrier structure 102 and the corresponding spring elements 316 are mounted on the table support element 108. The spring elements 316 are compression springs in one example, which are held in a compressed state against a spring force in the retracted stowed position P1 of the table element 106 and the table support element 108, so that the latch element 304 is locked in the latch device 302. Upon release of the table support element 108 (with the table element 106 being in the retracted stowed position P1), the spring element 316 pushes the table support element 108 away from the bracket 314 (by the spring force) substantially towards the deployed use position P2, for example, until a front side 350 of the table element 106 protrudes from the opening 122. In this position, a front side 350 can be grabbed by the passenger to pull the table element 106 towards him or her.

The adjustment mechanism 104 further includes a rail device 318 having at least a lower rail 320 and an upper rail 322 in movable engagement with the lower rail 320. The lower rail 320 is attached to the base plate 118 of the table carrier structure 102 and the upper rail 322 is attached to the table support element 108, wherein the table support element 108 is linearly displaceable relative to the lower rail 320. The table element 106 is thereby linearly displaceable relative to the table carrier structure 102. In the deployed use position P2, the table element 106 is positioned in front of a passenger seated behind the console element 200. For example, the table element 106 is positioned above a passenger's lap in the deployed use position P2.

Figure 3:
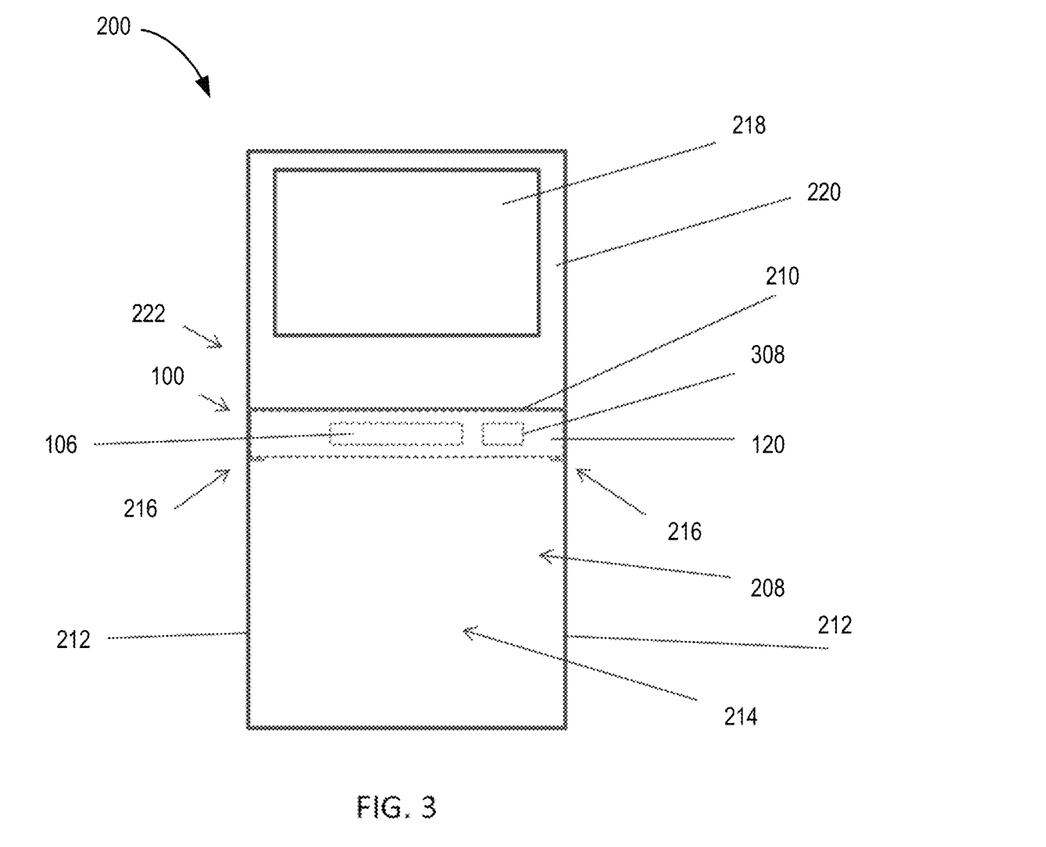
FIG. 3 shows schematically in a rear view an implementation of a console element comprising a tray table apparatus in accordance with an example.
Figure 4A:
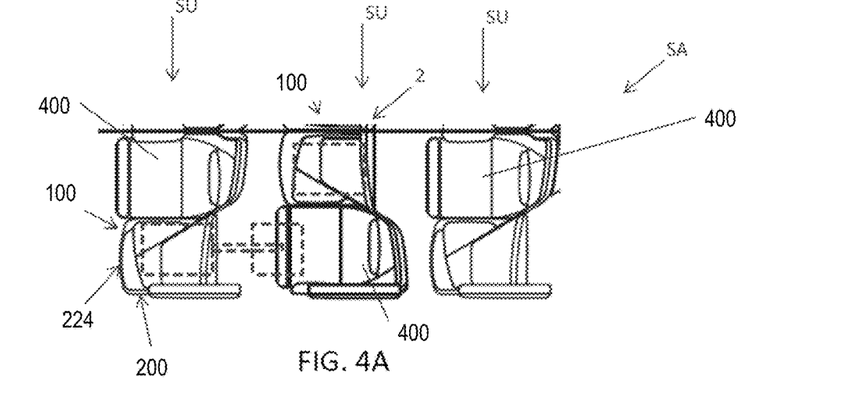
FIGS. 4A to 4C show schematically in upper views implementations of seat arrangements having a number of seat units arranged one behind another in accordance with an example.
Figure 4B:
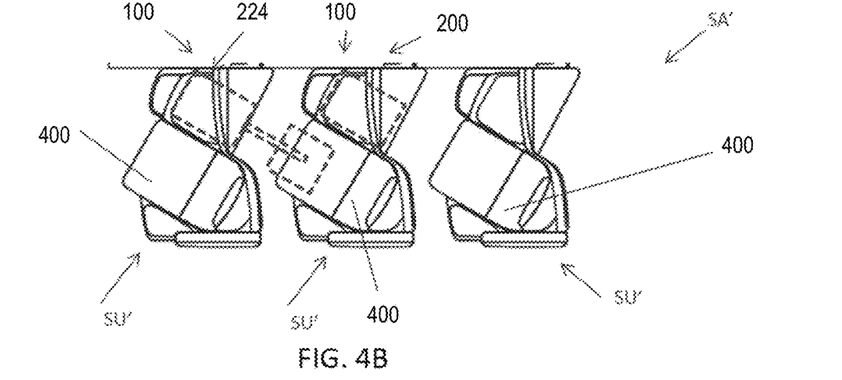
Figure 4C:
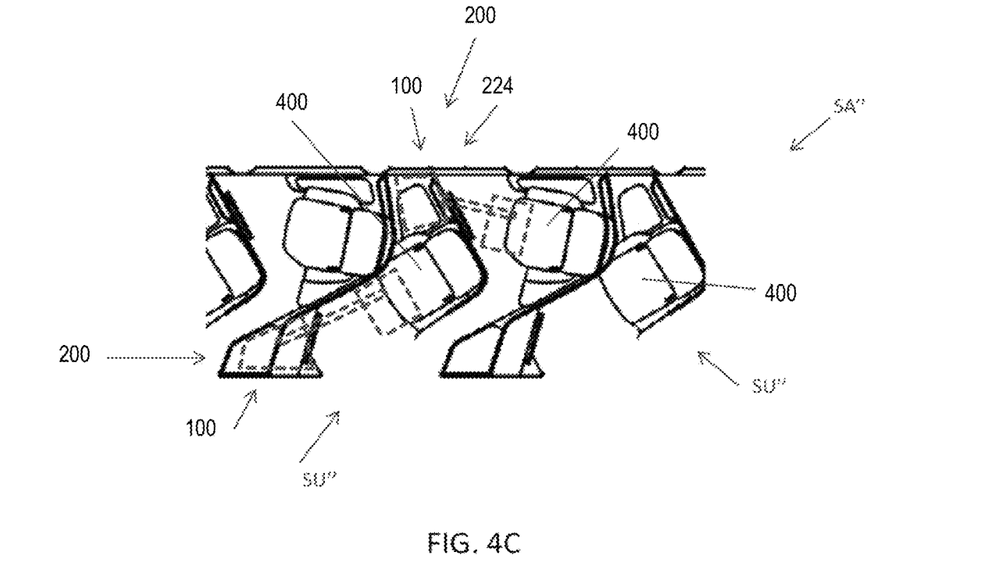

FIG. 3 shows schematically in a rear view an implementation of a console element 200 including the tray table apparatus 100. The console element 200 includes a console base structure 222 with a front utility structure 224 (as shown in FIGS. 4A to 4C), an open rear structure 208, and the tray table apparatus 100 as described above, wherein the tray table apparatus 100 is releasably mounted to the console base structure 222 within the open rear structure 208. The console base structure 222 is configured substantially box-shaped with an upper wall 210 and lateral walls 212 extending in a downward direction from the upper wall 210, creating the open rear structure 208, wherein the tray table apparatus 100 is held in position in an area of the upper wall 210. It should be noted that the console base structure 222 can have different shapes and sizes, such as based on the configuration of the tray table apparatus 100.

The open rear structure 208 includes a footwell space 214 for a passenger seated behind the console base structure 222. The utility structure 224 includes at least one of a shelf, an armrest, a table, storage space and storage means, or other devices. The storage means can provide storage space for a remote control, magazines, suitcases, shoes, headphones or other items belonging to the passenger or airline. Additionally, the utility structure 224 can include service and operational elements, such as switches and an HMI-panel to control operable features of the seat 400 and/or a seat unit SU to SU" (as shown in FIGS. 4A to 4C).

The open rear structure 208 includes a mounting device 216 located at a defined distance (e.g., predefined or pre-configured) from the upper wall 210 in a downward direction, whereas the tray table apparatus 100, which is configured as a pre-assembled module M, is arranged between the upper wall 210 and the mounting device 216. The console element 200 further includes a display 218 in the illustrated example, such as an entertainment device for the passenger seated behind the console element 200 and which is mounted on a partition screen 220 vertically extending above the open rear structure 208.

FIGS. 4A to 4C show schematically in upper views, implementations of seat arrangements SA to SA" having a number of different seat units SU to SU" arranged one behind another. Each seat unit SU to SU", illustrated as aircraft seat units, include at least a seat 400 and a console element 200 as described herein, wherein the console element 200 is arranged substantially laterally relative to the seat 400 and providing a front utility structure for a passenger of the adjacent seat 400, and an open rear structure 208 with at least a tray table apparatus 100 for a passenger seated behind the respective console element 200.

Figure 5A:
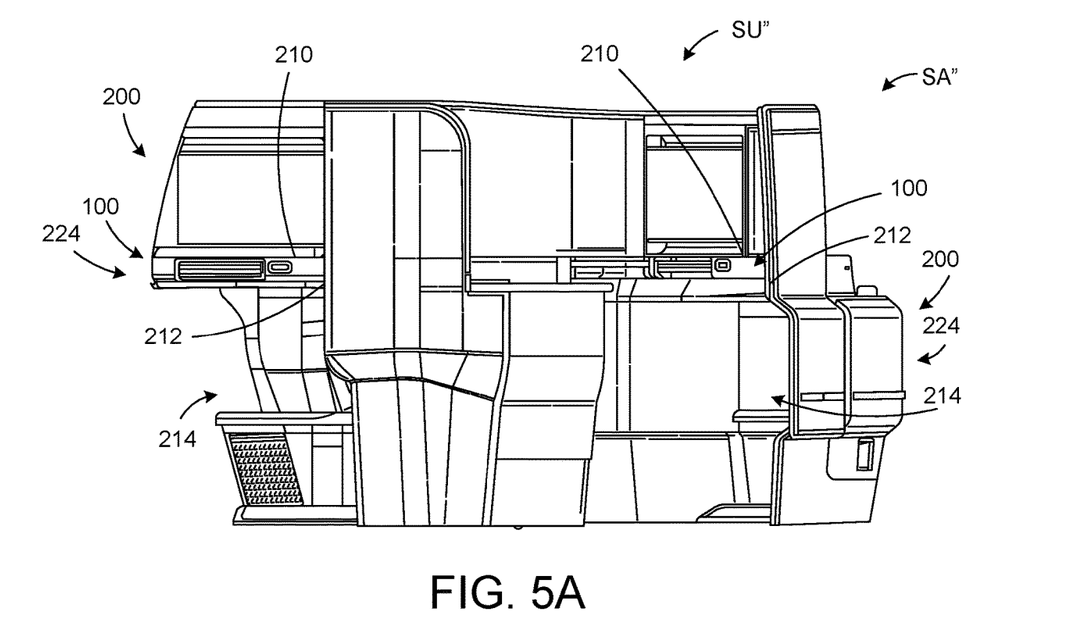
FIGS. 5A to 5C show in perspective views an implementation of a seat arrangement according to FIG. 4C.
Figure 5B:
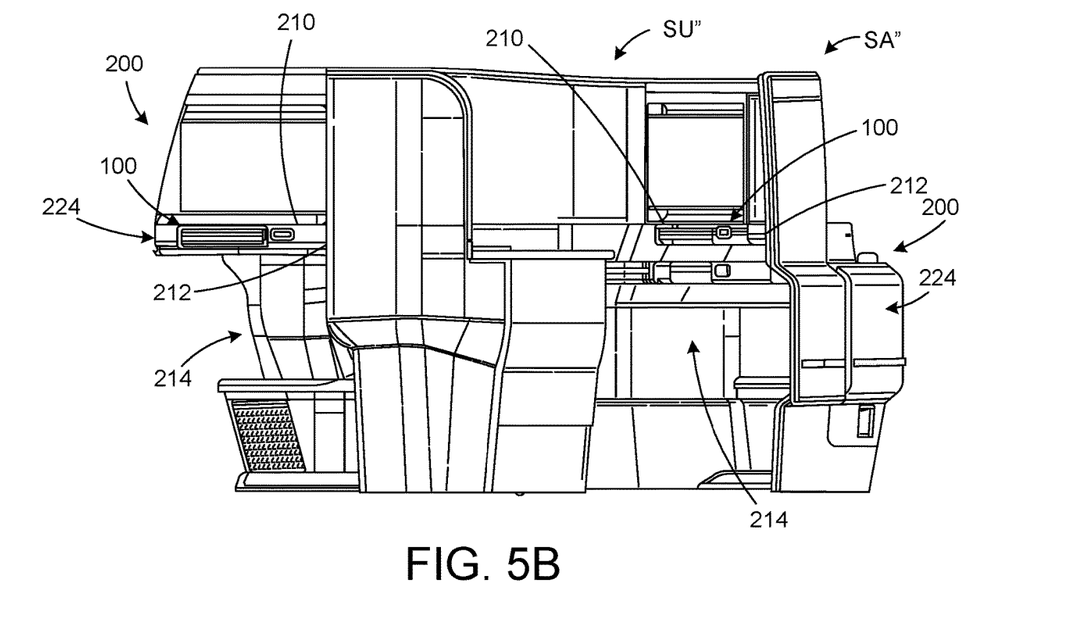
Figure 5C:
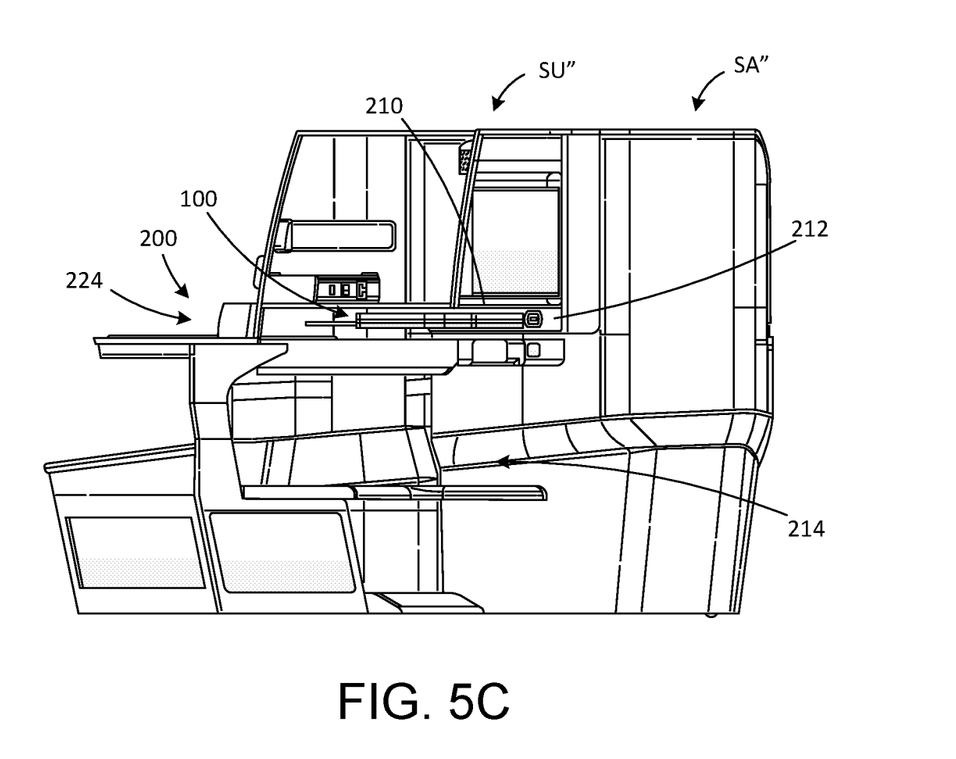

FIGS. 5A to 5C show in perspective views, in particular perspective rear views, the seat arrangement SA" having a number of seat units SU" arranged substantially behind each other. The tray table apparatus 100 of the illustrated seat unit SU" is mounted to the console base structure 206 in a position relative to the upper wall 210 and/or to the lateral wall 212 in an area of the upper wall 210 of each console element 200.

Thus, various implementations as described in one or more examples, provide a tray table apparatus for a console element, wherein the console element can form part of or be installed within a seat unit.

Figure 6:
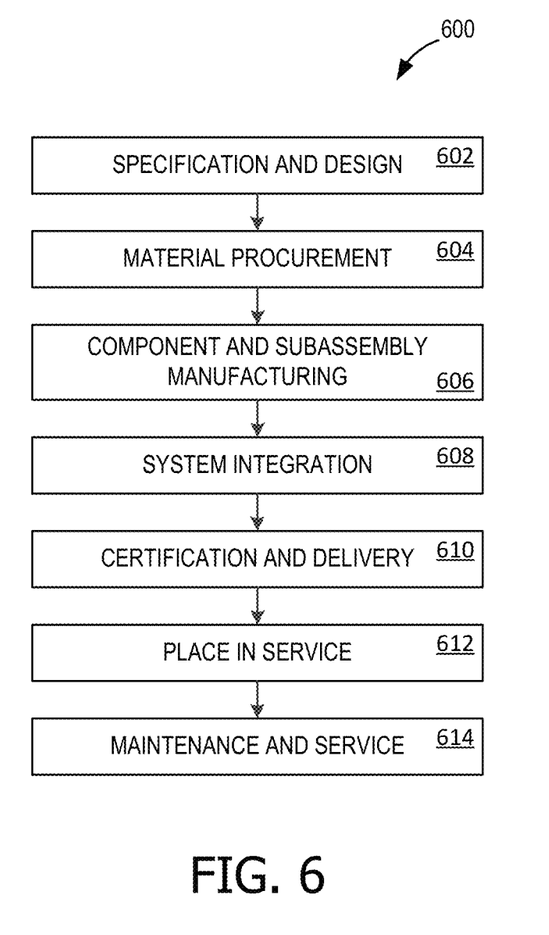
FIG. 6 is a block diagram of an apparatus production and service method that advantageously employs various aspects of the disclosure in accordance with an example.
Figure 7:
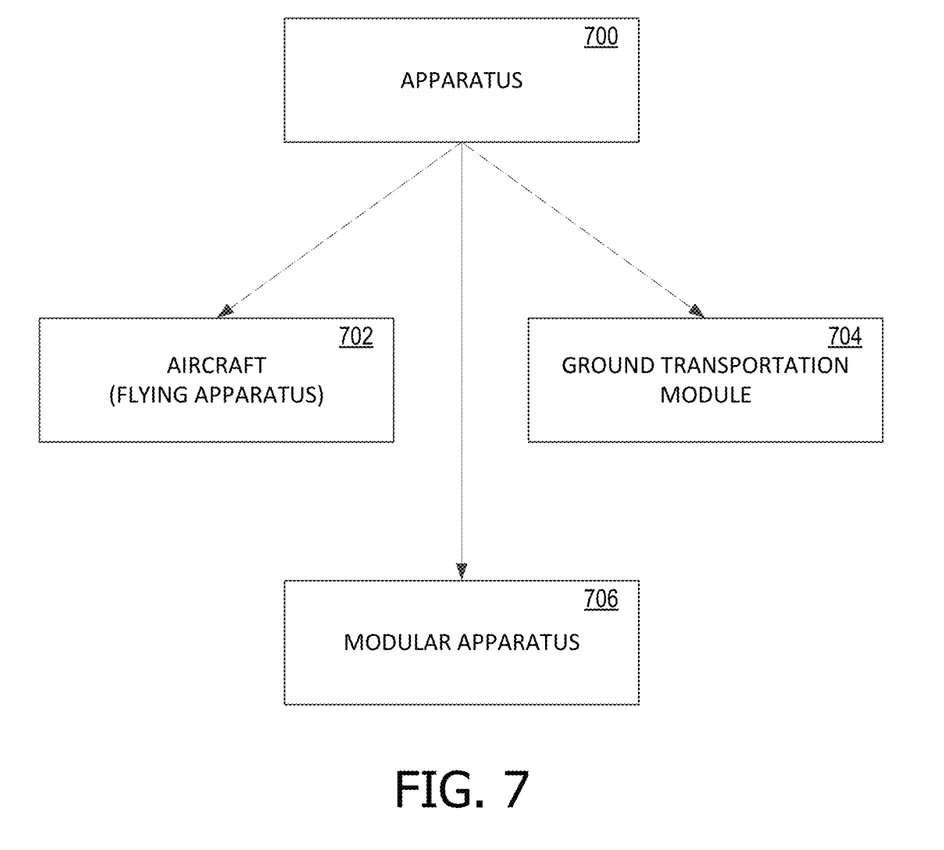
FIG. 7 is a block diagram of an apparatus for which various aspects of the disclosure may be advantageously employed in accordance with an example.
Figure 8:
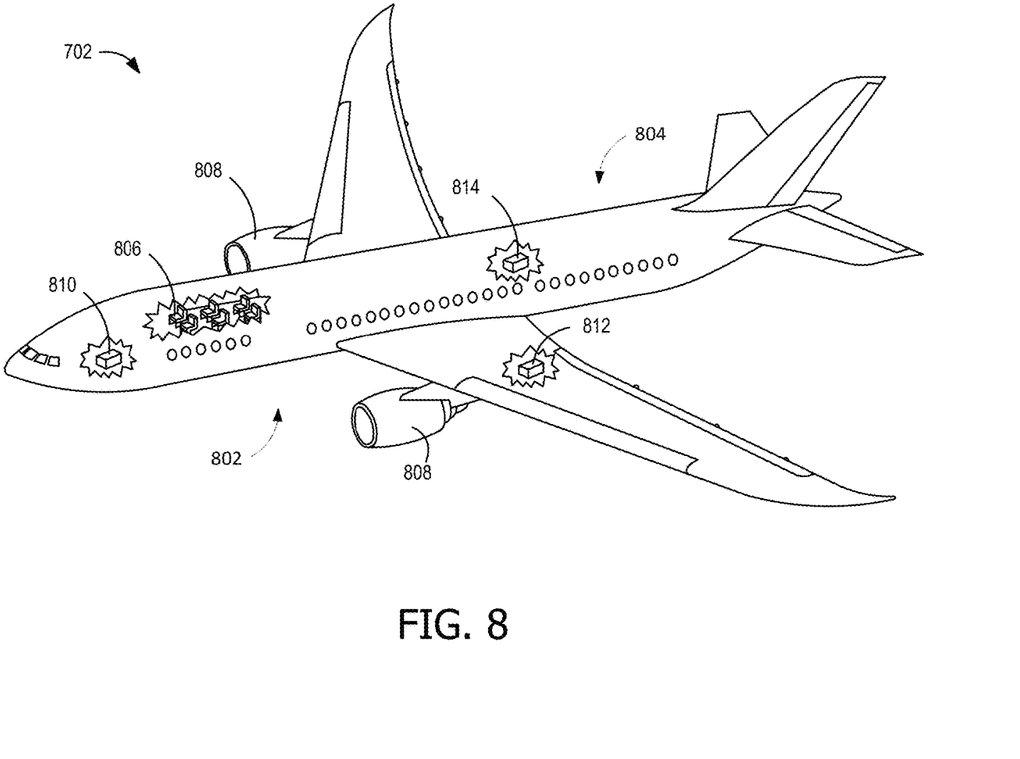
FIG. 8 is a schematic perspective view of a particular flying apparatus in accordance with an example.

Some examples of the disclosure are used in manufacturing and service applications as shown and described in relation to FIGS. 6 to 8. Thus, examples of the disclosure are described in the context of an apparatus of manufacturing and service method 600 shown in FIG. 6 and an apparatus 700 shown in FIG. 7. In FIG. 6, a diagram illustrating an apparatus manufacturing and service method 600 is depicted in accordance with an example. In one example, during pre-production, the apparatus manufacturing and service method 600 includes specification and design 602 of the apparatus 700 and material procurement 604. During production, component, and subassembly manufacturing 606 and system integration 608 of the apparatus 700 takes place. Thereafter, the apparatus 700 goes through certification and delivery 610 in order to be placed in service 612. While in service by a customer, the apparatus 700 is scheduled for routine maintenance and service 614, which in one example, includes modification, reconfiguration, refurbishment, and other maintenance or service subject to configuration management, described herein.

In one example, each of the processes of the apparatus manufacturing and service method 600 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 7, the apparatus 700 is provided. As shown in FIG. 7, an example of the apparatus 700 is a flying apparatus 702, such as an aerospace vehicle, aircraft, air cargo, flying car, satellite, planetary probe, deep space probe, solar probe, and the like. As also shown in FIG. 7, a further example of the apparatus 700 is a ground transportation apparatus 704, such as an automobile, a truck, heavy equipment, construction equipment, a boat, a ship, a submarine, and the like. A further example of the apparatus 700 shown in FIG. 7 is a modular apparatus 706 that comprises at least one or more of the following modules: an air module, a payload module, and a ground module. The air module provides air lift or flying capability. The payload module provides the capability of transporting objects such as cargo or live objects (people, animals, etc.). The ground module provides the capability of ground mobility. The disclosed solutions and examples herein can be applied to each of the modules separately or in groups, such as air and payload modules, or payload and ground modules, etc. or all modules.

With reference now to FIG. 8, a more specific diagram of the flying apparatus 702 is depicted in which an implementations of the disclosure are advantageously employed. In this example, the flying apparatus 702 is an aircraft produced by the apparatus manufacturing and service method 600 in FIG. 6 and includes an airframe 802 with a plurality of systems 804 and an interior 806, which can include seats and the tray table apparatus 100. Examples of the plurality of systems 804 include one or more of a propulsion system 808, an electrical system 810, a hydraulic system 812, and an environmental system 814. However, other systems are also candidates for inclusion. Although an aerospace example is shown, different advantageous examples are applied to other industries, such as the automotive industry, etc.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts. The terms "comprising," "including," and "having" are intended to be inclusive and mean that there can be additional elements other than the listed elements. In other words, the use of "including," "comprising," "having," "containing," "involving," and variations thereof, is meant to encompass the items listed thereafter and additional items. Further, references to "one implementation" are not intended to be interpreted as excluding the existence of additional implementations that also incorporate the recited features. The term "exemplary" is intended to mean "an example of".

When introducing elements of aspects and implementations of the disclosure or the examples thereof, the articles "a," "an," "the," and "said" are intended to mean that there are one or more of the elements. In other words, the indefinite articles "a", "an", "the", and "said" as used in the specification and in the claims, unless clearly indicated to the contrary, should be understood to mean "at least one."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations of the disclosure without departing from their scope. While the dimensions and types of materials described herein are intended to define the parameters of the various implementations of the disclosure, the implementations are by no means limiting and are example implementations. Many other implementations will be apparent to those of ordinary skill in the art upon reviewing the above description. The scope of the various implementations of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various implementations of the disclosure, including the best mode, and also to enable any person of ordinary skill in the art to practice the various implementations of the disclosure, including making and using any devices or systems and performing any incorporated methods. The patentable scope of the various implementations of the disclosure is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A tray table apparatus, comprising:
a table carrier structure releasably mountable to a console element, the table carrier structure configured as a housing and comprising at least a base plate and a front wall extending vertically from the base plate that together define a space behind the front wall;
an adjustment mechanism housed within the table carrier structure and supported on the base plate, the adjustment mechanism having a table support element movable relative to the table carrier structure and further comprising a latch mechanism having a latch device arranged on the base plate and a corresponding latch element arranged on the table support element, wherein the adjustment mechanism comprises a latch release mechanism having a release actuation device arranged in an area of the front wall of the table carrier structure and a release cable connecting the release actuation device and the latch device; and
a table element coupled to the table support element and together movable between at least a retracted stowed position in which the table element is housed within the table carrier structure and a deployed use position in which the table element protrudes from the table carrier structure.

2. The tray table apparatus of claim 1, wherein the tray table apparatus is a pre-assembled module configured to be releasably mountable to the console element, wherein the table carrier structure, the adjustment mechanism, and the table element are pre-assembled to form the pre-assembled module.

3. The tray table apparatus of claim 1, wherein (i) in the retracted stowed position the table element is fully retracted and arranged behind the front wall and (ii) in the deployed use position the table element is guided through an opening of the front wall of the table carrier structure to extend from the front wall.

4. The tray table apparatus of claim 1, wherein the latch device engages the corresponding latch element in the retracted stowed position of the table element.

5. The tray table apparatus of claim 1, wherein the release cable is a Bowden cable.

6. The tray table apparatus of claim 1, wherein the adjustment mechanism comprises at least a mechanical deploy mechanism having at least a bracket arranged on the base plate of the table carrier structure and a corresponding spring element arranged on the table support element.

7. The tray table apparatus of claim 6, wherein the corresponding spring element is a compression spring held in a compressed state against a spring force in the retracted stowed position of the table element, and wherein upon release of the table element in the retracted stowed position, the corresponding spring element pushes the table element away from the bracket by the spring force and substantially towards the deployed use position.

8. The tray table apparatus of claim 1, wherein the adjustment mechanism comprises at least a rail device having at least a lower rail coupled to the base plate of the table carrier structure and an upper rail coupled to the table support element, wherein the upper rail is movable relative to the lower rail.

9. The tray table apparatus of claim 1, wherein the table element is linearly displaceable relative to the table carrier structure.

10. The tray table apparatus of claim 1, wherein the table element is a bi-fold table.

11. A console element for a seat, the console element comprising:
a console base structure having a front utility structure and an open rear structure; and
a tray table apparatus having:
a table carrier structure releasably mountable to the console base structure, the table carrier structure configured as a housing and comprising at least a base plate and a front wall extending vertically from the base plate that together define a space behind the front wall;
an adjustment mechanism housed within the table carrier structure and supported on the base plate, the adjustment mechanism having a table support element movable relative to the table carrier structure and further comprising a latch mechanism having a latch device arranged on the base plate and a corresponding latch element arranged on the table support element, wherein the adjustment mechanism comprises a latch release mechanism having a release actuation device arranged in an area of the front wall of the table carrier structure and a release cable connecting the release actuation device and the latch device; and a table element coupled to the table support element, the table element movable with the table carrier structure between at least a retracted stowed position in which the table element is housed within the table carrier structure and a deployed use position in which the table element protrudes from the table carrier structure.

12. The console element of claim 11, wherein the tray table apparatus is releasably mounted to the console base structure within the open rear structure.

13. The console element of claim 11, wherein the console base structure is configured substantially box-shaped with an upper wall and lateral walls extending in a downward direction from the upper wall, wherein the tray table apparatus is held in position in an area of the upper wall.

14. The console element of claim 13, wherein the open rear structure comprises a mounting device located at a defined distance from the upper wall in a downward direction, and the tray table apparatus is arranged between the upper wall and the mounting device.

15. An aircraft seat unit, comprising:
a seat; and
a console element arranged substantially laterally relative to the seat and having a front utility structure for a passenger of the seat and an open rear structure with at least a tray table apparatus for a passenger seated behind the console element, wherein,
the tray table apparatus comprises a table carrier structure releasably mountable to a console base structure of the console element, the table carrier structure configured as a housing and comprising at least a base plate and a front wall extending vertically from the base plate that together define a space behind the front wall, and an adjustment mechanism housed within the table carrier structure and supported on the base plate, the adjustment mechanism having a table support element movable relative to the table carrier structure and further comprising a latch mechanism having a latch device arranged on the base plate and a corresponding latch element arranged on the table support element, wherein the adjustment mechanism comprises a latch release mechanism having a release actuation device arranged in an area of the front wall of the table carrier structure and a release cable connecting the release actuation device and the latch device, and a table element coupled to the table support element and together movable between at least a retracted stowed position in which the table element is housed within the table carrier structure and a deployed use position in which the table element protrudes from the table carrier structure.

16. The aircraft seat unit of claim 15, wherein the tray table apparatus is releasably mounted to the console base structure within an open rear structure.

17. The aircraft seat unit of claim 15, wherein the console base structure is configured substantially box-shaped with an upper wall and lateral walls extending in a downward direction from the upper wall, wherein the tray table apparatus is held in position in an area of the upper wall.

* * * * *